A. H. SMITH.
DEMOUNTABLE RIM FOR VEHICLE WHEELS.
APPLICATION FILED JUNE 16, 1915.

1,229,801.

Patented June 12, 1917.
2 SHEETS—SHEET 1.

A. H. SMITH.
DEMOUNTABLE RIM FOR VEHICLE WHEELS.
APPLICATION FILED JUNE 16, 1915.
1,229,801.
Patented June 12, 1917.
2 SHEETS—SHEET 2.
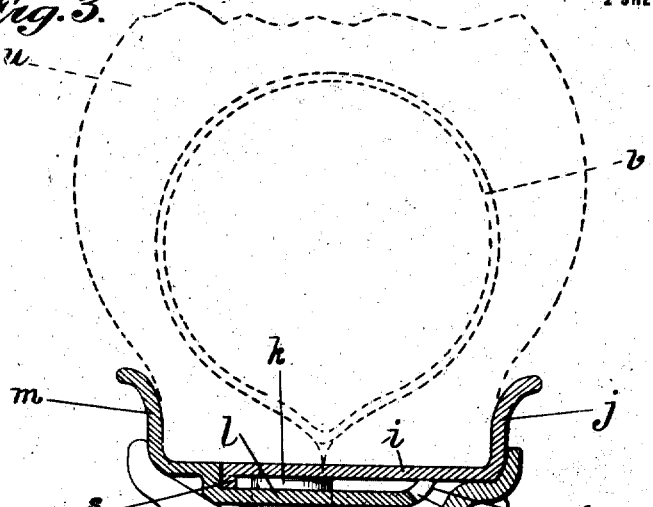
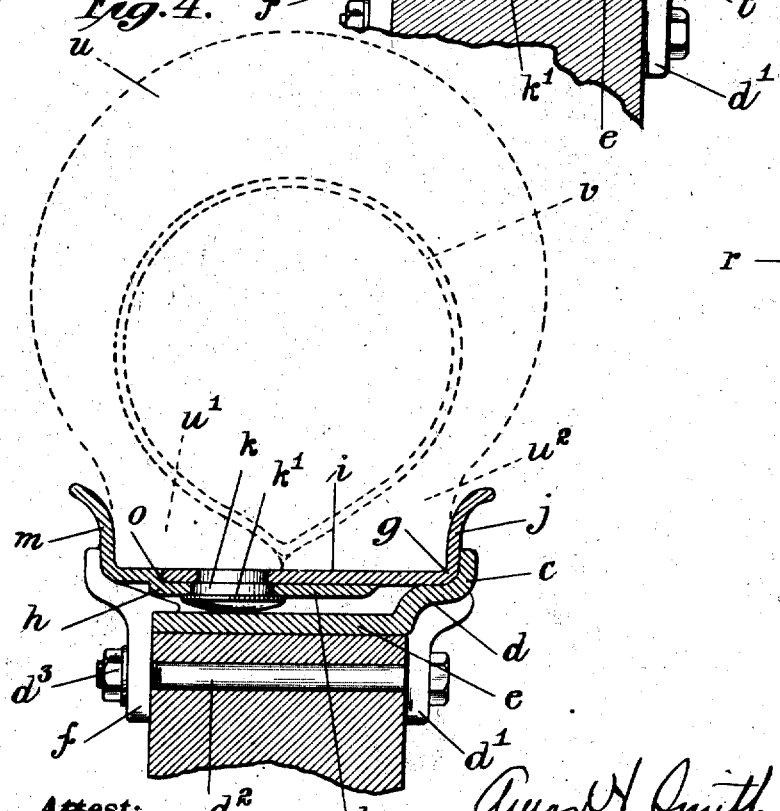
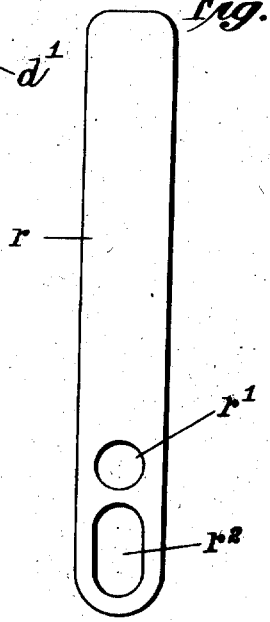
Attest:
Inventor: Amos H. Smith
by Frank P. Wentworth
his Atty.

UNITED STATES PATENT OFFICE.

AMOS H. SMITH, OF NEW YORK, N. Y.

DEMOUNTABLE RIM FOR VEHICLE-WHEELS.

1,229,801.  Specification of Letters Patent.  Patented June 12, 1917.

Application filed June 16, 1915. Serial No. 34,348.

*To all whom it may concern:*

Be it known that I, AMOS H. SMITH, a citizen of the United States, residing at the borough of Bronx, in the city of New York, county of Bronx, and State of New York, have invented certain new and useful Improvements in Demountable Rims for Vehicle-Wheels, of which the following is a specification, reference being had therein to the accompanying drawings, which form a part thereof.

My invention relates to demountable rims for vehicle wheels and more particularly to a type thereof adapted to be removed from the wheel in its entirety to facilitate the removal of the tire from a wheel or the mounting of the tire thereupon.

Rims of this character are so designed as to be mounted upon or removed from the vehicle wheel with the shoe in position thereon, and are frequently composed of independent separable sections so assembled as to permit the removal of one of these sections laterally as to the other to afford that clearance necessary to permit the mounting of the shoe and the contained inner tube, upon or their removal from, the said rim. Heretofore the construction of rims of this character has been such as to require considerable time, and labor, to effect the removal of the rim from the wheel and the removal of the tire from the rim. By my invention I provide a rim so constructed as to secure a permanent relation of the sections thereof with relation to each other, and to the felly of the wheel, while in use, and yet permit these sections to be readily removed from the felly and quickly separated, to facilitate the mounting of the tire therein, or its removal therefrom.

The rim is so constructed as to require a short circumferential movement of one of the sections relative to the other to permit the uniting or separating of these parts, each section being provided with independent means coöperating with the wheel felly whereby movement of either or both sections circumferentially of the wheel is prevented when the rim is in place thereon. The rim is also so constructed as to be supported along both edges thereof. The two sections of said demountable rim are so constructed and arranged as to permit the necessary relative circumferential and lateral movement thereof, to effect the disconnection and separation of the sections without likelihood of injury to the valve stem. The two sections of the rim are so constructed as to permit the application thereto of sufficient power to impart that circumferential movement of the sections relatively to each other, necessary to so position the parts as to permit the separation thereof. This circumferential movement is secured by means of hand levers adapted to act upon projections or studs carried respectively by the two sections of the rim, thus limiting the application of power for securing the relative movement of the two sections, to substantially a single point. Incidentally, the circumferential movement of the two sections relatively to each other, will have the effect of preventing the formation of a bond between these sections after prolonged use. To minimize the binding of the two sections, I preferably so construct these sections as to restrict the contact area of one with the other to as small a surface as is practicable, a construction resulting in the spacing apart of the two sections through the greater portion thereof. To avoid the accumulation of liquid in the clearance space between these two sections, it is desirable to provide openings through which any liquid entering between the sections will drain.

The base flange of one of the rim sections extends over and bears upon the base flange of the other, presenting outwardly a smooth, continuous surface closing the space between the beads of the tire shoe, thus avoiding all possibility of the pinching, and resultant puncture, of the inner tube when mounting the tire upon said rim. The outer face of the base flange of that section forming the bottom of the rim channel, has no openings therein excepting that necessary for the insertion of the valve stem, and the various studs carried by this section do not extend beyond said surface in a degree to present any projections which would have a tendency to injure the inner tube in any way.

The invention consists primarily in a demountable rim for vehicle wheels embodying therein two separable, circular sections each having a side flange and a base flange, the base flange of one of said sections being adapted to extend across and bear upon the base flange of the other, the inner of said base flanges having a plurality of bayonet slots therein opening outwardly of said flange and the outer of said base flanges having a valve stem opening therethrough, a plurality of inwardly extending studs carried by the outer of said base flanges and adapted respectively to be passed through a bayonet slot in the inner of said base flanges and engage the wheel felly whereby the felly is utilized as a support for said outer base flange, and operative connections between each of said rim sections and the wheel felly whereby circumferential movement of both of said sections is prevented; and in such other novel features of construction and combination of parts as are hereinafter set forth and described and more particularly pointed out in the claims hereto appended.

Referring to the drawings:—

Fig. 3 is a cross section of the rim and felly upon an enlarged scale, showing the preferred form of the invention;

Fig. 4 is a similar view of a modification of the invention; and

Fig. 5 is a detail view of a hand tool used in unlocking the two sections of the rim.

Like letters refer to like parts throughout the several views.

Figure 1:
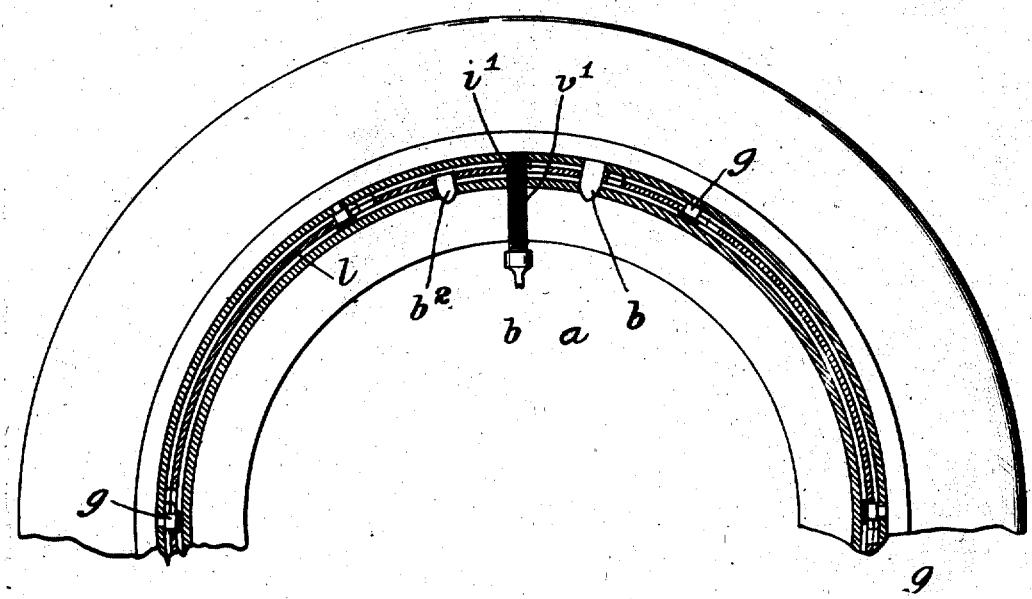
Figure 1 is a vertical section of a portion of a vehicle wheel having my improved demountable rim thereon.

In the embodiment of my invention shown in the accompanying drawings, the felly of the wheel is indicated at $b$. Along the inner edge of the felly $b$, I provide a retaining flange $c$ extending substantially radially of the wheel from a seat $d$ carried by a sheathing strip $e$ permanently secured to the felly. The seat $d$ projects laterally beyond the side of the felly and is supported at different points about the felly by a plurality of clamp brackets $d'$, one of which is shown in Figs. 3 and 4 respectively. The said brackets are held in position upon the felly by means of a bolt $d^2$ passing transversely through the felly.

The demountable rim is mounted upon the sheathing strip, or metal felly band $e$, with the inner edge thereof bearing upon the seat $d$ and the outer edge thereof supported by removable clamp brackets $f$ detachably mounted upon the felly in the proper relation to the demountable rim by means of the bolts $d^2$ and nuts $d^3$ carried thereby. Said rim comprises two separable, circular sections $g$ and $h$ adapted to be so connected as to be capable of being mounted upon, and removed from, the wheel simultaneously.

The section $g$ consists of a base flange $i$ of a width sufficiently great to span the gap between the beads of the ordinary tire shoe, the upper face of this flange being continuous and smooth to avoid all possibility of the cutting of an inner tube by reason of projections extending outwardly therefrom. Projecting from the base flange $i$ and substantially radially thereof is a side flange $j$ which may be of the "no rim cut", "clencher" or any other desired type.

The demountable rim section $g$ has along the under face thereof, and inwardly projecting, a plurality of studs $k$ by means of which the inner section $h$ of said rim may be connected with said section $g$ in a manner to permit the quick and convenient connection or separation of these sections. Preferably these studs $k$ are provided with enlarged semispherical heads $k'$ adapted to bear upon the sheathing $e$ to afford a support for the demountable rim having a contact area sufficiently restricted to avoid excessive binding of the demountable rim upon the said sheathing strip $e$ or the "freezing" of the demountable rim and said strip. The studs $k$ also serve to properly position the demountable rim so as to facilitate the positioning and withdrawal of the clamp brackets $f$.

The base flange $i$ has therethrough an opening $i'$ through which the valve stem of the inflatable tire is adapted to be inserted.

The rim section $h$ is provided with a base flange $l$ extending laterally of the felly $b$ and with a side flange $m$ similar to the side flange $j$ of the section $g$. The flange $l$ is provided with a plurality of bayonet slots $n$ adapted respectively to coöperate with the studs $k$, these slots opening outwardly of said flange so as to permit the complete separation of the two sections $g$—$h$. In addition to the bayonet slots $n$ the flange $l$ is provided with a bayonet slot $n'$ adapted to afford clearance for the valve stem when separating said sections.

The base flange $l$ of the section $h$ is preferably stepped adjacent the flange $m$ as at $o$ to form a shoulder against which the base flange $i$ is adapted to abut. By positioning this shoulder adjacent the flange $m$, any gap between the two sections of the rim will be directly under the outer bead of the tire shoe, so as to avoid any possibility of the pinching of the inner tube when the two sections are brought together.

The manner of connecting the two sections of the rim is such that there would be likelihood of the creeping of these sections relatively to each other, and to the valve stem opening in the felly, were it not that I provide means for preventing such relative movement when the rim is in position upon the wheel. This means preferably consists of a tapered stud $p$ carried by the base flange $i$ of the section $g$, and a similar stud $p'$ carried by the base flange $l$ of the section $k$. The stud $p$ passes through a bayonet slot $n^2$ in the flange $l$. The studs $p$—$p'$ are adapted to enter openings $b'$—$b^2$ through the sheathing strip $e$ and in the felly $b$. The studs $p$—$p'$ are arranged adjacent, and upon opposite sides of, the openings for the valve stem so that simultaneously with the insertion of said stem through the felly, said studs will enter the opening $b'$—$b^2$. The studs $p$—$p'$ are positioned substantially centrally of the width of the rim $g$—$h$.

To permit the convenient circumferential movement of the sections $g$—$h$ relatively to each other, I provide a stud $q$ on the bottom of the base flange $l$ adjacent the bayonet slot $n^2$. The relative movement of the two parts is secured by means of a lever hand tool $r$ having therein a round opening $r'$ and a slot $r^2$, said opening and slot being respectively adapted to pass over and engage the stud $q$ carried by the section $h$ and the stud $p$ carried by the section $g$. In this manner sufficient force may be simultaneously applied to both sections to overcome any binding between the sections by reason of the "freezing" of these sections together, from rust or any other condition.

In the modification shown in Fig. 4, there is greater likelihood of the binding of the two sections than in the preferred form of the invention. The two forms of the invention shown are distinguishable from each other merely by those details of construction designed to limit or prevent this binding action. In the preferred form of the invention shown in Fig. 3, I provide the base flange $i$ with a downwardly turned edge $s$, the side of which is adapted to abut against the shoulder $o$ and the edge of which is adapted to bear upon the flange $l$ adjacent said shoulder. The edge or the base flange $l$ is upwardly turned as at $t$ so as to bear upon the flange $i$ adjacent the side flange $j$. In this manner clearance is formed between the greater portions of the surfaces of the flanges $i$ and $l$ presented toward each other. To prevent the accumulation of liquid between these sections, I provide the up-turned edge $t$ with drain openings $t'$.

In the accompanying drawings I have shown at $u$ an ordinary pneumatic tire shoe having beads $u'$—$u^2$. The inner tube is shown at $v$ and the valve stem at $v'$.

The operation of the herein described rim is substantially as follows:—

In describing the manner of use of the demountable rim herein described, I will assume that this rim is in position upon a wheel, and that it is necessary to effect repairs to a tire carried by said rim. The nuts $d^2$ are first unscrewed sufficiently to permit the various clamp brackets $f$ to be moved laterally sufficiently to clear the felly and to be withdrawn from under the rim section $h$, which section seats upon said clamp brackets. The removal of these brackets allows the demountable rim and the tire carried thereby to be moved laterally of the wheel. This lateral movement is accomplished by swinging that portion of the rim diametrically opposite the valve stem, clear of the felly and raising the rim sufficiently to draw the valve stem upwardly from the felly, at the same time withdrawing the studs $p$—$p'$ from the openings $b'$—$b^2$. While the demountable rim is thus removed from the felly, the sections $g$—$h$ thereof will still be united by reason of the engagement of the studs $k$ with the bayonet slots $n$.

Figure 2:
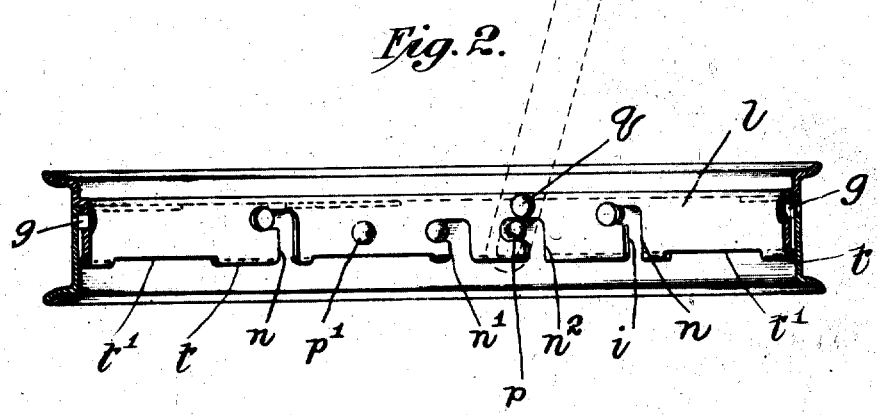
Fig. 2 is a bottom view of a sector of said rim.

To permit the removal of the tire from the rim, it is necessary to disconnect and separate the two sections $h$—$g$. This is accomplished by the use of the hand tool $r$. The opening $r'$ of this tool is fitted to the stud $q$ and the slot $r^2$ is fitted to the stud $p$. The long lever handle of this tool $r$ is then moved to the left (Fig. 2) causing relative circumferential movement of the two sections $g$ and $h$. The valve stem passing through the opening $i'$ will move with the section $g$, the bayonet slot $n^2$ permitting this movement. The various bayonet slots coöperating with the studs $k$ and with the stud $p$, will limit the relative movement of the two sections so as to prevent injury to the valve stem. If the two sections $g$—$h$ bind, they may be readily started by a sharp blow of a hammer or wrench upon the tool $r$. When the various studs have been brought into alinement with the laterally extending portion of the respective bayonet slots, the two sections $g$—$h$ may be separated so as to permit the shoe $n$ and its contained inner tube $v$ to be slid from the flange $i$.

In mounting a tire upon the demountable rim, the inner tube is first inserted within the shoe in the usual manner and the shoe is slid over and upon the base flange $i$, the valve stem being inserted through the opening $i'$. The base flange $l$ of the section $h$ is then slid beneath the base flange $i$ of the section $g$, the various bayonet slots having first been properly positioned with relation to their coöperating studs $k$ and the valve stem $v'$. When the flange $l$ abuts against the shoulder $o$, the tool $r$ is used to impart the necessary circumferential movement of the two sections relatively to each other to bring the studs $k$ and $p$ within the circumferentially extending section of the various bayonet slots $n$ and $n'$. In assembling the section $h$ with relation to the section $g$, it will be observed that the base flange $l$ does not engage the beads of the tire shoe until the section $h$ is practically in a position where the two sections may be locked together.

The rim $g$—$h$ is then mounted upon the wheel by first inserting the valve stem through the opening in the sheathing $e$ and felly $b$, and inserting the studs $p$—$p'$ in the openings $b'$—$b^2$, in said sheathing and in the felly. The rim is then dropped to place and pushed upon the sheathing strip or metal felly band e. The projecting heads k' within the base flange l form widely separated points of support for said demountable rim and thus prevent the binding of the rim when mounting it upon the said sheathing strip or metal felly band. As the demountable rim comes to rest, one edge thereof will rest upon the seat d and will bear against the retaining flange c. The studs k will bear upon the sheathing strip or metal rim e adjacent the opposite edge of the felly. When the tire is in this position the clamp brackets f are raised and placed between the base flange l and the sheathing strip e.

Inasmuch as the stud p is carried by the base flange i of the outer rim section and the stud p' is carried by the base flange l of the inner rim section, both of these sections will be held against movement relatively to the felly when inserted in the openings b'—b² respectively, and hence will be held against movement relatively to each other.

In the preferred form of the invention the turned edges s—t in addition to spacing the flanges i and l apart to allow drainage space for any liquid which may enter between said flange, affords clearance for facilitating the mounting of the section h relative to the section g by limiting the frictional contact area between said section. If it be found desirable to use a lubricant between the flanges i—l the arrangement of these flanges is such as to permit this practice without likelihood of the oil reaching the rubber of the tire.

The number and arrangement of the clamp brackets f may be varied according to the diameter of the wheel. Such clips are at the present time used in connection with the rims for vehicle wheels and the present practices in the use of such brackets may be followed.

A demountable rim made in accordance with my invention may be quickly and conveniently removed from the wheel felly and the independent sections thereof may be quickly separated to permit the removal of a tire therefrom or its mounting therein. The likelihood of the binding of parts to an extent to interfere with the necessary movement of the two sections g—h is reduced to a minimum.

It is not my intention to limit the invention to the precise details of construction shown in the accompanying drawings, it being apparent that such may be varied without departing from the spirit and scope of the invention.

Having described the invention what I claim as new and desire to have protected by Letters Patent is:—

1. A demountable rim for vehicle wheels embodying therein two separable, circular sections each having tire engaging means and a base flange, the base flange of one of said sections being adapted to extend across and bear upon the base flange of the other, the inner of said base flanges having a plurality of slots therein opening outwardly of said flange, and the outer of said base flanges having a valve stem opening therethrough, a plurality of inwardly extending studs carried by the outer of said base flanges and adapted respectively to coöperate with a slot in the inner of said base flanges, semi-spherical heads on said studs whereby the lower face of the inner base flange is spaced away from the wheel felly, and operative connections between each of said rim sections and the wheel felly, whereby circumferential movement of one of said sections relatively to the other is prevented.

2. A demountable rim for vehicle wheels embodying therein two separable, circular sections each having tire engaging means and a base flange, the base flange of one of said sections being adapted to extend across and bear upon the base flange of the other, the inner of said base flanges having a plurality of slots therein opening outwardly of said flange, and the outer of said base flanges having a valve stem opening therethrough, a plurality of inwardly extending studs carried by the outer of said base flanges and adapted respectively to coöperate with a slot in the inner of said base flanges, and a stud carried by each of said base flanges and adapted to enter openings in the felly, whereby circumferential movement of one of said sections relatively to the other is prevented.

3. A demountable rim for vehicle wheels embodying therein two separable, circular sections each having tire engaging means and a base flange, the base flange of one of said sections being adapted to extend across and bear upon the base flange of the other, the inner of said base flanges having a plurality of slots therein opening outwardly of said flange, and the outer of said base flanges having a valve stem opening therethrough, a plurality of inwardly extending studs carried by the outer of said base flanges and adapted respectively to coöperate with a slot in the inner of said base flanges, semi-spherical heads on said studs whereby the lower face of the inner base flange is spaced away from the felly, and a stud carried by each of said base flanges and adapted to enter openings in the felly whereby circumferential movement of one of said sections relatively to the other is prevented.

4. A demountable rim for vericle wheels embodying therein two separable, circular sections each having tire engaging means and a base flange, the base flange of one of said sections being adapted to extend across and bear upon the base flange of the other, the inner of said base flanges having a plurality of slots therein opening outwardly of said flange, and the outer of said base flanges having a valve stem opening therethrough, a plurality of inwardly extending studs carried by the outer of said base flanges and adapted respectively to coöperate with a slot in the inner of said base flanges, a stud carried by each of said base flanges and adapted to enter openings in the felly whereby circumferential movement of one of said sections relatively to the other is prevented and a stud carried by the inner section adjacent said last named stud carried by the outer section and on one side thereof whereby circumferential movement may be imparted to said sections to permit the separation thereof.

5. A demountable rim for vehicle wheels embodying therein two separable, circular sections each having tire engaging means and a base flange, the base flange of one of said sections being adapted to extend across and bear upon the base flange of the other, the inner of said base flanges having a plurality of slots therein opening outwardly of said flange, and having a stepped portion adjacent the side flange thereof forming a shoulder against which the edge of the outer base flange is adapted to abut, the edge of the outer base flange being turned downwardly adjacent said shoulder and the edge of the inner base flange being turned upwardly whereby clearance between said base flanges is afforded except at said turned edges, and the outer of said base flanges having a valve stem opening therethrough, a plurality of inwardly extending studs carried by the outer of said base flanges and adapted respectively to coöperate with a slot in the inner of said base flanges, and operative connections between each of said rim sections and the wheel felly whereby circumferential movement of one of said sections relatively to the other is prevented.

6. A demountable rim for vehicle wheels embodying therein two separable, circular sections each having tire engaging means and a base flange, the base flange of one of said sections being adapted to extend across and bear upon the base flange of the other, the inner of said base flanges having a plurality of slots therein opening outwardly of said flange, and having a stepped portion adjacent the side flange thereof forming a shoulder against which the edge of the outer base flange is adapted to abut, the edge of the inner base flange being turned downwardly adjacent said shoulder and the edge of the outer base flange being turned upwardly and having drain openings therein whereby clearance between said base flanges is afforded except at said turned edges and any liquid accumulated between said flanges will flow therethrough and the outer of said base flanges having a valve stem opening therethrough, a plurality of inwardly extending studs carried by the outer of said base flanges and adapted respectively to coöperate with a slot in the inner of said base flanges, and operative connections between each of said rim sections and the wheel felly whereby circumferential movement of one of said sections relatively to the other is prevented.

7. A demountable rim for vehicle wheels embodying therein two separable, circular sections, each having tire engaging means and a base flange, coöperating means carried by said base flanges whereby the outer of said flanges is supported from and spaced away from the inner of said flanges, a plurality of studs carried by the outer of said flanges and projecting inwardly thereof, the inner of said base flanges having a plurality of slots through which said studs respectively are adapted to pass whereby said sections are tied together both radially of the wheel and laterally thereof and coöperating stud and socket connections between each of said sections and the felly whereby circumferential movement of one of said sections relatively to be the other is prevented, the outer of said sections having a valve stem opening therethrough and the inner of said sections having a slot in the operative relation to the said opening.

In witness whereof, I hereunto affix my signature in the presence of two subscribing witnesses, this 3d day of June, 1915.

AMOS H. SMITH.

Witnesses:
F. T. WENTWORTH,
JUDITH PARDEE.